(12) United States Patent
Bhide et al.

(10) Patent No.: US 12,223,049 B2
(45) Date of Patent: Feb. 11, 2025

(54) METHOD AND SYSTEM FOR CONFIGURING A FEATURE FOR AN ENERGY METER AS LEGALLY IMPORTANT OR LEGALLY NON-IMPORTANT

(71) Applicant: Honeywell International Inc., Morris Plains, NJ (US)

(72) Inventors: Anil Bhide, Telangana (IN); Naga Lakshmi Vijaya Shanthi Bandreddi, Telangana (IN); Ritesh Naik, Telangana (IN); Nagaraja Sundaresh, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/364,838

(22) Filed: Jun. 30, 2021

(65) Prior Publication Data
US 2023/0004646 A1    Jan. 5, 2023

(51) Int. Cl.
| | |
|---|---|
| G06F 21/00 | (2013.01) |
| G06F 21/44 | (2013.01) |
| G06F 21/57 | (2013.01) |
| G06F 21/62 | (2013.01) |
| H04Q 3/00 | (2006.01) |

(52) U.S. Cl.
CPC ............. *G06F 21/57* (2013.01); *G06F 21/44* (2013.01); *G06F 21/6209* (2013.01); *H04Q 3/0095* (2013.01)

(58) Field of Classification Search
CPC ...... G06F 21/44; G06F 21/57; G06F 21/6209; H04Q 3/0095
See application file for complete search history.

(56) References Cited

U.S. PATENT DOCUMENTS

| | | |
|---|---|---|
| 9,250,308 B2 | 2/2016 | Bowman et al. |
| 9,581,726 B2 | 2/2017 | Rangarajan et al. |
| 10,938,847 B2 | 3/2021 | Davis et al. |
| 2003/0110380 A1 | 6/2003 | Carolsfeld et al. |

(Continued)

FOREIGN PATENT DOCUMENTS

| | | |
|---|---|---|
| CN | 108761160 A | 11/2018 |
| CN | 106569166 B | 8/2019 |

(Continued)

OTHER PUBLICATIONS

Firmware, Wikipedia, Retrieved from "https://en.wikipedia.org/w/index.php?title=Firmware&oldid=1016009355", page was last edited on Apr. 4, 2021, at 22:00 (UTC).

(Continued)

*Primary Examiner* — Rodman Alexander Mahmoudi
(74) *Attorney, Agent, or Firm* — Ortiz & Lopez, PLLC; Kermit D. Lopez; Luis M. Ortiz (57) ABSTRACT

Methods and systems for access control involve dynamically controlling an access to firmware running a certified feature in an energy meter and a non-certified feature in the energy meter. The access can be based on a bifurcation between the certified feature and the non-certified feature running in the energy meter on one or more of a single microcontroller or a group of different microcontrollers.

19 Claims, 8 Drawing Sheets

(56) References Cited

U.S. PATENT DOCUMENTS

| | | | |
|---|---|---|---|
| 2007/0055889 A1* | 3/2007 | Henneberry | H02H 7/261 |
| | | | 713/186 |
| 2013/0212381 A1 | 8/2013 | Bousamra et al. | |
| 2013/0262844 A1 | 10/2013 | Hester | |
| 2013/0304958 A1 | 11/2013 | Schoenfeldt et al. | |
| 2016/0315765 A1* | 10/2016 | Zheng | H04N 21/42623 |
| 2017/0180137 A1* | 6/2017 | Spanier | H04L 9/3239 |
| 2019/0297492 A1 | 9/2019 | Bohrer et al. | |
| 2021/0117579 A1* | 4/2021 | Dekens | G06F 21/74 |

FOREIGN PATENT DOCUMENTS

| | | |
|---|---|---|
| EP | 2 994 724 B1 | 5/2017 |
| WO | 2010054662 A2 | 5/2010 |
| WO | WO-2010054663 A2 * | 5/2010 ............... G01D 4/00 |

OTHER PUBLICATIONS

Microcontroller, Wikipedia, Retrieved from "https://en.wikipedia.org/w/index.php?title=Microcontroller&oldid=1018420936", page was last edited on Apr. 18, 2021, at 00:41 (UTC).

European search Report for corresponding EP Application No. 22180273.9.

* cited by examiner

METHOD AND SYSTEM FOR CONFIGURING A FEATURE FOR AN ENERGY METER AS LEGALLY IMPORTANT OR LEGALLY NON-IMPORTANT

TECHNICAL FIELD

Embodiments are generally related to the field of energy meters. Embodiments also relate to techniques for controlling access to the functionalities and features associated with an energy meter. Embodiments further relate to methods and systems for dynamically controlling access to the functionalities and features of an energy meter, including preventing access and modifications to certified features versus non-certified features.

BACKGROUND

In the field of energy meters, there are functionalities or features, which may have a 'legal importance' such as, for example, the actual billing or basis for commercial transactions. There are also functionalities or features associated with energy meters that are 'legally non relevant' with settings that a user may modify based on his/her requirement. For legally important functionalities, it should not be possible to change any settings once the electric meter is shipped from the factory.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for a method and system for controlling access to functionalities, features and components associated with an energy meter.

It is another aspect of the disclosed embodiments to provide for a method and system for controlling access to functionalities, features and components of an energy meter that are considered legally relevant or legally non-relevant.

It is a further aspect of the disclosed embodiments to provide for a method and system that meets the requirement of certification related to legally important or legally relevant data, while providing users with the flexibility to configure energy meter functionalities or features according a particular customer requirement or a country requirement.

The aforementioned aspects and other objectives can now be achieved as described herein. In an embodiment, a method of access control can involve dynamically controlling an access to firmware running a certified feature in an energy meter and a non-certified feature in the energy meter, wherein the access is based on a bifurcation between the certified feature and the non-certified feature running in the energy meter.

In an embodiment of the method, the access can be based on the bifurcation between the certified feature and the non-certified feature running in the energy meter on at least one of: a single microcontroller or a group of different microcontrollers.

In an embodiment of the method, an access controller associated with the energy meter can dynamically control the access to the firmware.

An embodiment of the method can further involve receiving a request for the access to the firmware, and permitting the access to the firmware, in response to determining that the request relates to the certified feature.

An embodiment of the method can further involve receiving a request for the access to the firmware, and denying the access to the firmware, in response to determining that the request relates to the non-certified feature.

An embodiment of the method can further involve receiving a request for the access to the firmware, permitting the access to the firmware, in response to determining that the request relates to the certified feature, or denying the access to the firmware, in response to determining that the request relates to the non-certified feature.

In an embodiment of the method the request may be considered not valid, when the request relates to the non-certified feature.

An embodiment of the method can further involve generating an error response when the request is related to the non-certified feature, and sending the error response to a user associated with the request.

In another embodiment, a system for access control to an energy meter can include an energy meter, and an access controller associated with the energy meter, wherein the access controller is operable to dynamically control an access to firmware running a certified feature in the energy meter and a non-certified feature in the energy meter, wherein the access is based on a bifurcation between the certified feature and the non-certified feature running in the energy meter.

In an embodiment of the system, the access can be based on the bifurcation between the certified feature and the non-certified feature running in the energy meter on at least one of: a single microcontroller or a group of different microcontrollers.

In an embodiment of the system, an access controller associated with the energy meter can dynamically control the access to the firmware.

In an embodiment of the system, the access controller can receive a request for the access to the firmware, and permit the access to the firmware, in response to determining that the request relates to the certified feature.

In an embodiment of the system, the access controller can receive a request for the access to the firmware, and deny the access to the firmware, in response to determining that the request relates to the non-certified feature.

In an embodiment of the system, the access controller can receive a request for the access to the firmware, permit the access to the firmware, in response to determining that the request relates to the certified feature, or deny the access to the firmware, in response to determining that the request relates to the non-certified feature.

In an embodiment of the system, the request may be considered not valid, when the request relates to the non-certified feature.

In an embodiment of the system, the access controller can generate an error response when the request is related to the non-certified feature.

In an embodiment of the system, the access controller can send the error response to a user associated with the request.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
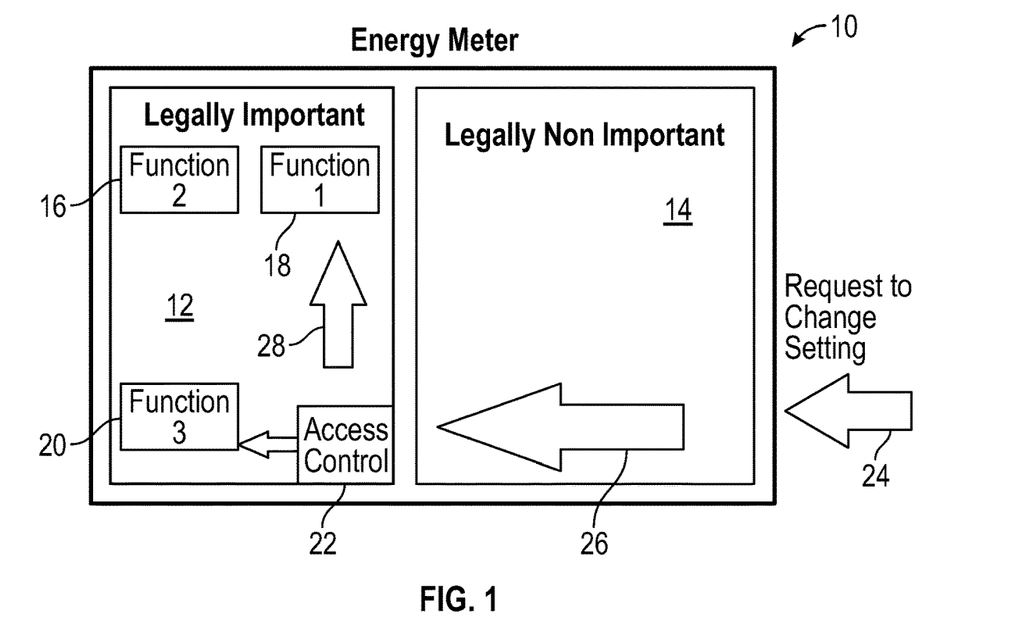
FIG. 1 illustrates a block diagram of an energy meter, in accordance with an embodiment.

FIG. 1 illustrates a block diagram of an energy meter 10, in accordance with an embodiment. The energy meter 10 can be divided into two sections—a section 12 related to 'legally important' features and a section 14 related to 'legally non-important' features. Note that the term 'legally important' as utilized herein can also relate to features that are 'legally relevant' and/or 'certified'. Likewise, the term 'legally non-important' can also relate to features that are 'legally non-relevant' and/or 'non-certified'. These terms will be discussed in further detail herein.

In the example energy meter 10 depicted in FIG. 1, section 12 of the energy meter 10 can include a group of functionalities, features or components such as a first function 16, a second function 18, and a third function 20. An access controller 22 can control access to the first function 16, the second function 18, the third function 20, and so on. Note that in the embodiment shown in FIG. 1, only three functions 16, 18, and 20 are shown. It can be appreciated, however, that fewer or more functions can be implemented in the context of an energy meter such as the energy meter 10.

The first function 16, the second function 18, and the third function 20 are considered 'legally important' or 'legally relevant' functions. In some cases, the first function 16, the second function 18, and the third function 20 may include or involve certified features or components (as opposed to non-certified features or components). The access controller 22 can be configured to dynamically control access to firmware running one or more certified features and/or non-certified features in the energy meter 10. This access can be based on a bifurcation between the certified feature and the non-certified feature running in the energy meter 10 on one or more, for example, a single microcontroller or a group of different microcontrollers.

The term 'firmware' as utilized herein can relate to a class or computer software can provide low-level control for specific hardware associated with the energy meter 10. Such firmware can either provide a standardized operating environment for more complex device software associated with the energy meter 10, or for a less complex energy meter, can act as the device's complete operating system, performing all or most control, monitoring and data manipulation functions. The access controller 22 can be implemented through the use of such firmware.

The term 'microcontroller' as utilized herein can be referred to as an MCU (for 'microcontroller unit') and can be implemented as a small computer on a single metal-oxide semiconductor (MOS) integrated circuit (IC) chip. A microcontroller or MCU can contain one or more CPUs (processor cores) along with memory and programmable input/output peripherals. Program memory in the form of, for example, ferroelectric RAM, NOR flash or OTP ROM may be included on the chip, as well as a small amount of RAM. An example of a microcontroller is the MCU 37 shown in FIG. 3.

As shown in FIG. 1, arrow 24 represents a request to change a setting (or feature) associated with the energy meter. This request can be received by the energy meter 10, as indicated by arrow 26, and transmitted to the access controller 22. Such a request may involve a request for access to the firmware associated with the energy meter 10. The access controller can permit access to such firmware, in response to determining that the request relates to a certified feature. Such firmware may operation or process one or more features or functions as function 16, function 18, function 20, and so on.

Assuming, for example, that a function or component such as function 16, for example, is certified, the access controller would allow access to function 16 in response to the request. Assuming, however, that that function 18 is not certified, the access controller may not allow access to function 18. In this example scenario, the access controller 22 would receive the request for access to the firmware, and then deny access to the firmware, in response to a determination that the request relates to a non-certified feature.

Arrow 24 thus represents a request by a user (e.g., a customer) to change a setting of a feature or functionality associated with or more functionalities such as function 16, function 18, function 20, etc. The information related to the request can be fed to the access controller 22 (also referred to as an 'ACCESS CONTROL object'), which holds or maintains the bifurcation between the legally important or non-important features. If a request is made for a non-important feature, then the request can be passed on to a respective function. If the request is made for important feature, this request can be denied. If the access controller determines, for example, that the request is not valid (e.g., because it relates to a certified feature), an error response can sent back to the user indicating that the request is invalid or is being denied.

The disclosed approach can be implemented to permit access to, for example, legally non-important functionalities or non-certified features, but deny access requests to features that may be considered legally important or certified features. This ability to deny access to certified features or grant access to non-certified features can be implemented through a control mechanism such as the access controller 22, which controls access to features/settings running, for example, in firmware in one or more microcontrollers associated with the energy meter 10.

Access control can be facilitated by the access controller 22 through, for example, a DLMS Object having a structure as shown below.

- Object: - 1-aa:bb.cc.dd.255
- Interface Class: -1
- Data Type - Arrey
- Example
  <node text="AS3000G MFG - Get object: 1-aa:bb.cc.dd.255 - class: 1 - attribute: 2>
    <node text="data">
      <node text="array">
        <node text="structure">
        <node text="octet-string OBIS of feature to control
        <node text="bit-string xxxx">
        <node text="bit-string xxxx">
        <node text="bit-string xxxx">
      </node>

The following explains the above structure. The octet-string OBIS Code is a 'legally important' feature, which needs to be controlled by the access controller 22. The "bit-string xxxx" is a bit string that can control the "Read Access" of the attributes. Each attribute can be controlled through one bit (e.g., 0=No Access, 1=Read Access). The "bit-string xxxx" is the bit string that can control the "Write Access" of the attributes. Each attribute can be controlled through one bit (e.g., 0=No Access, 1=Write Access). The "bit-string xxxx" is the bit string that can control the methods. Each method can be controlled through one bit (e.g., 0=No Access, 1=Execute Access). This control mechanism itself is considered as 'legally important' and can stop changing access to the various functionalities of function 16, function 18, function 20, one so on, after the electric meter 10 is shipped. Thus, the disclosed approach can meet the requirements of certification related to legally important data, while still providing flexibility to configure the functionality based on each customer requirement or country requirement and considering the functionality as legally important or non-important.

Figure 2:
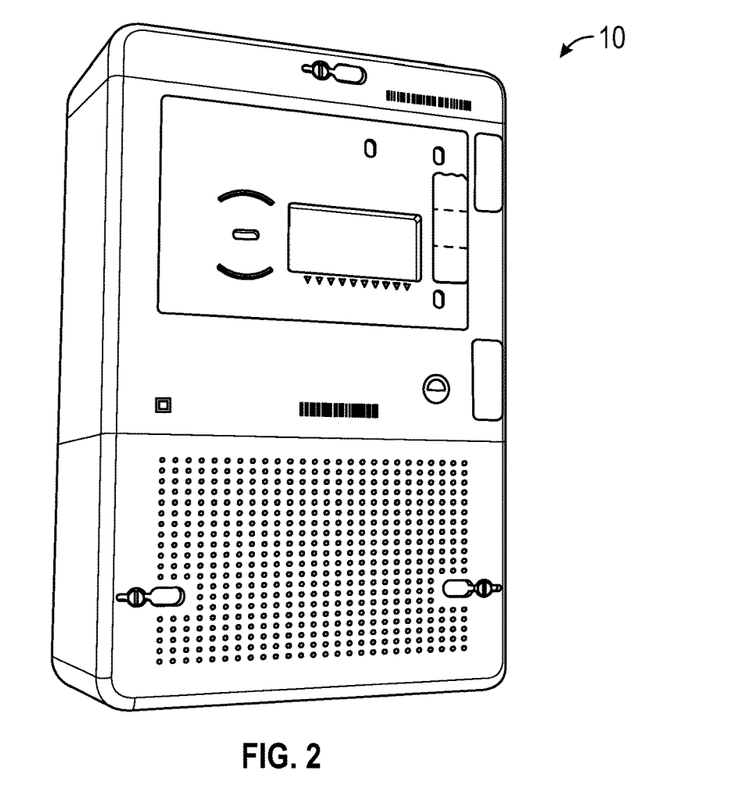
FIG. 2 illustrates a pictorial diagram of an energy meter, in accordance with an embodiment.

FIG. 2 illustrates a pictorial diagram of an energy meter 10, in accordance with an embodiment. FIG. 2 is presented herein to provide an example of one possible embodiment of the energy meter 10. It can be appreciated that other types of energy meters may be utilized to implement energy meter 10 and that the particular configuration shown in FIG. 2 is provided for general illustrative and exemplary purposes only.

Figure 3:
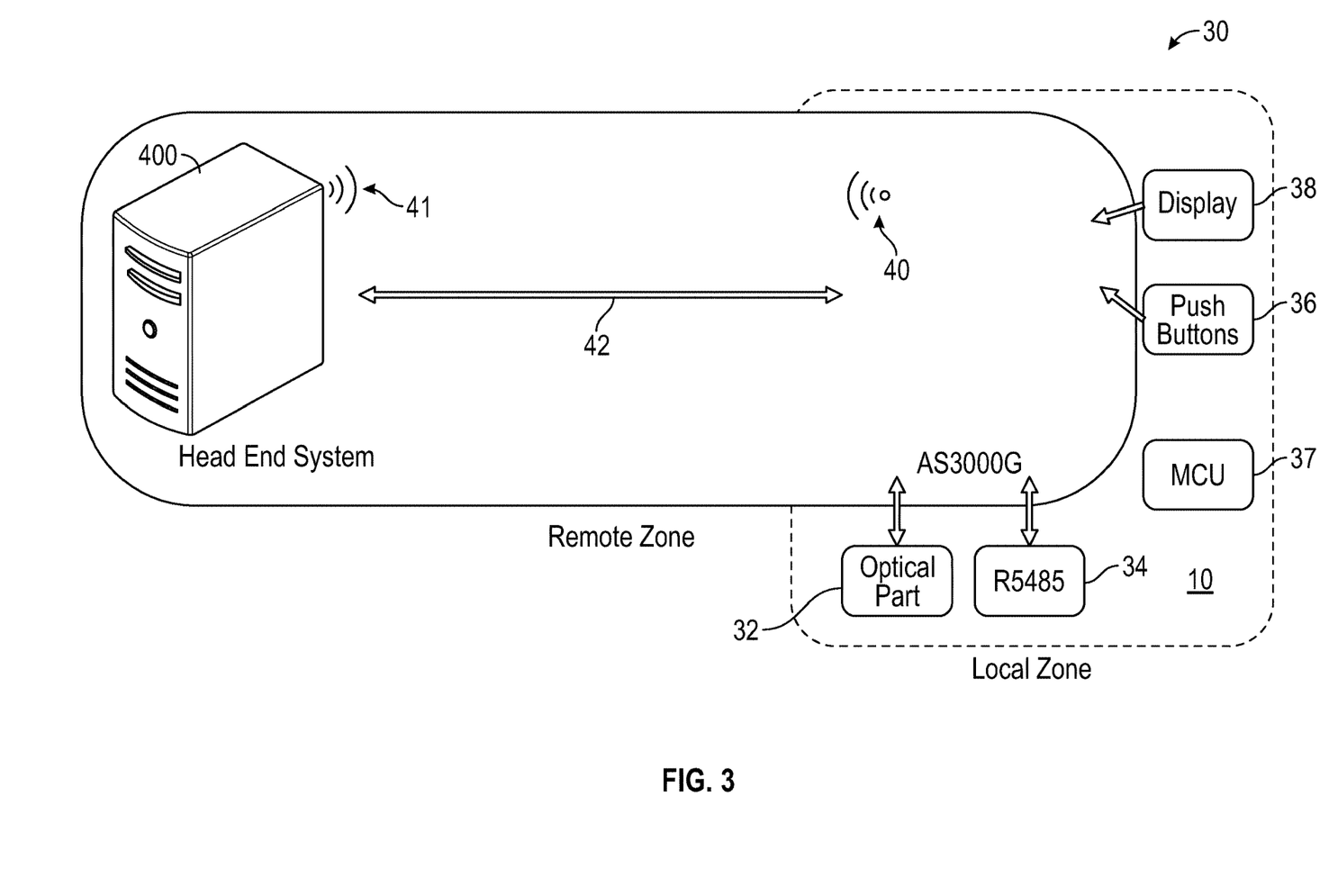
FIG. 3 illustrates an energy metering system that includes an energy meter the can communicate with a head end system, in accordance with an embodiment.

FIG. 3 illustrates an energy metering system 30 that can include the energy meter 10, which can communicate with a head end system 400, in accordance with an embodiment. Note that the head end system 400 can be implemented as a data-processing apparatus such as the data-processing apparatus 400 shown in FIG. 10. The energy meter 10 shown in FIG. 3 is similar to the energy meter 10 depicted in FIG. 1. The energy meter 10 illustrated in FIG. 3, however, includes additional features or components not shown in the embodiment shown in FIG. 1. Note that identical reference numerals as utilized herein can refer to identical or similar parts or elements.

The energy meter 10 depicted in FIG. 3 can include an optical port 32, a driver/receiver 34 (e.g., RS485), a microcontroller 37 (MCU), push buttons 36, and a display 38. As indicated by arrow 42 in FIG. 3, the energy meter 10 can communicate the head end system 400 through wireless communications 40 and 41. The energy metering system 30 can be divided into a remote zone and a local zone, as indicated in FIG. 3.

Figure 4:
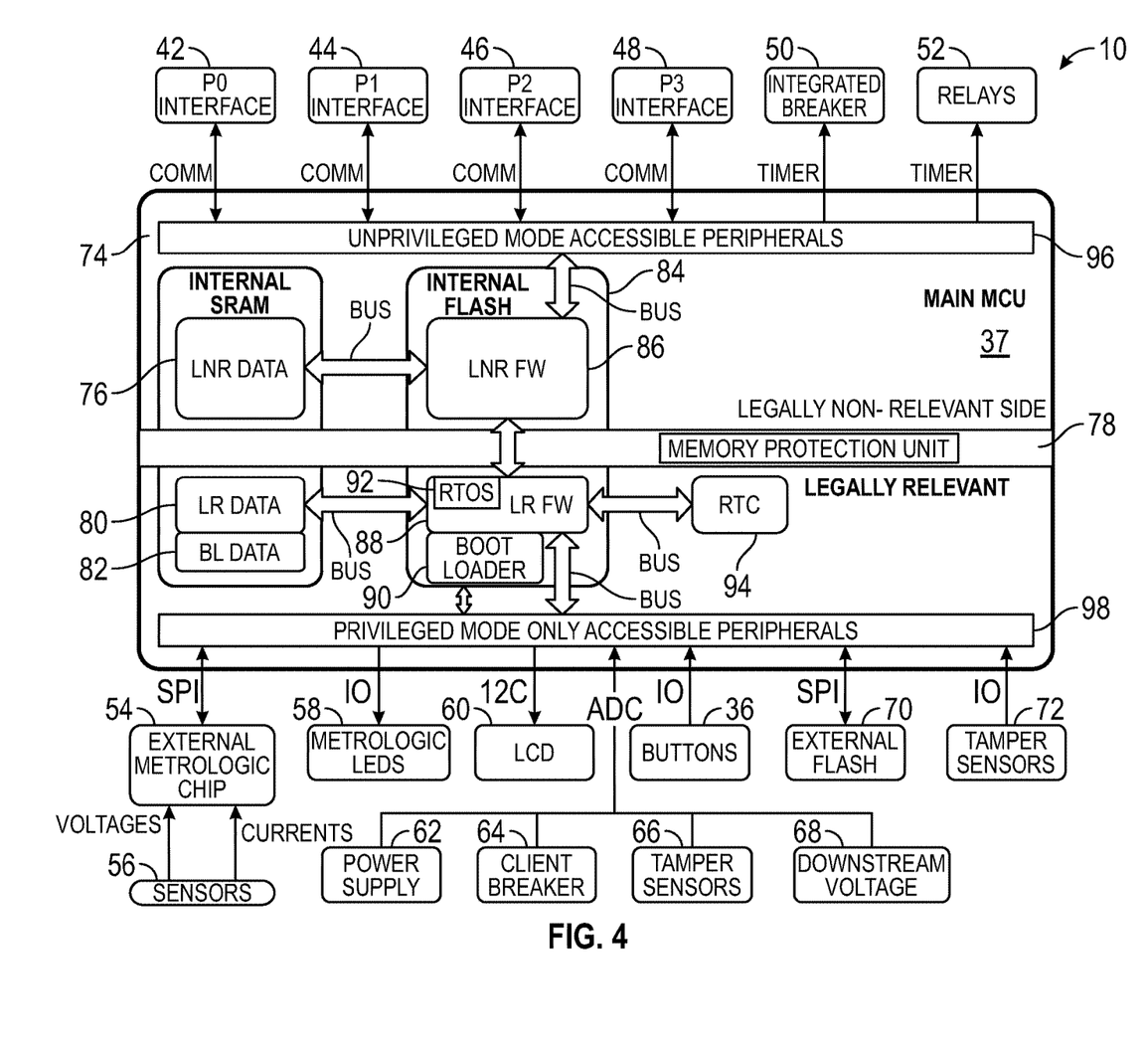
FIG. 4 illustrates a schematic diagram of an energy meter, in accordance with an embodiment.

FIG. 4 illustrates a schematic diagram of the energy meter 10, in accordance with another embodiment. FIG. 4 depicts a more detailed view of the energy meter 10 including a variety of features, functionalities and components. For example, the energy meter 10 can include an internal SRAM 74 and an internal Flash memory 84. The internal SRAM 74 can store LNR (Legally Non-Relevant) data 76, LR (Legally Relevant) data 80, and BL data 82. The internal Flash memory 84 can store LNR FW 86, LR FW 88 including RTOS (Real Time Operating System) 92, and a boot loader 90. Note that a microcontroller such as the MCU 37 can maintain, for example, the internal SRAM 74 and the internal Flash memory 84. In the embodiment depicted in FIG. 4, the MCU 37 is shown as functioning as a 'Main MCU'. It can be appreciated, however, that the energy meter 10 may include other microcontrollers depending on design considerations.

The MCU 37 can also include a memory protection unit 37 and RTC 94. The RTC 94 can communicate with the LR FW 88. Note that the MCU 37 is bifurcated between a 'legally non-relevant side' and a 'legally relevant side' as shown in FIG. 4, which is analogous to the bifurcation depicted in FIG. 1. That is, as shown in FIG. 1, the energy meter 10 can be divided into two sections—a section 12 related to 'legally important' features and a section 14 related to 'legally non-important' features.

The MCU 37 can communicate with a variety of peripherals including unprivileged mode accessible peripherals 96 and privileged mode only accessible peripherals 98. The unprivileged mode peripherals can include, for example, an interface 42, an interface 44, an interface 46, an interface 48, an integrated breaker 50, and a one or more relays 52. Privileged mode only peripherals can include, for example, an external metrologic chip 54, metrologic LEDs 58, an LCD 60 buttons 36, external FLASH memory 70, and one or more tamper sensors 72. Other privileged mode only peripherals may include a power supply 62, a client breaker 64, one or more tamper sensors 66, and a downstream voltage source 68. Note that the external metrologic chip 54 can receive voltages and currents from one or more sensors such as sensors 56.

Figure 5:
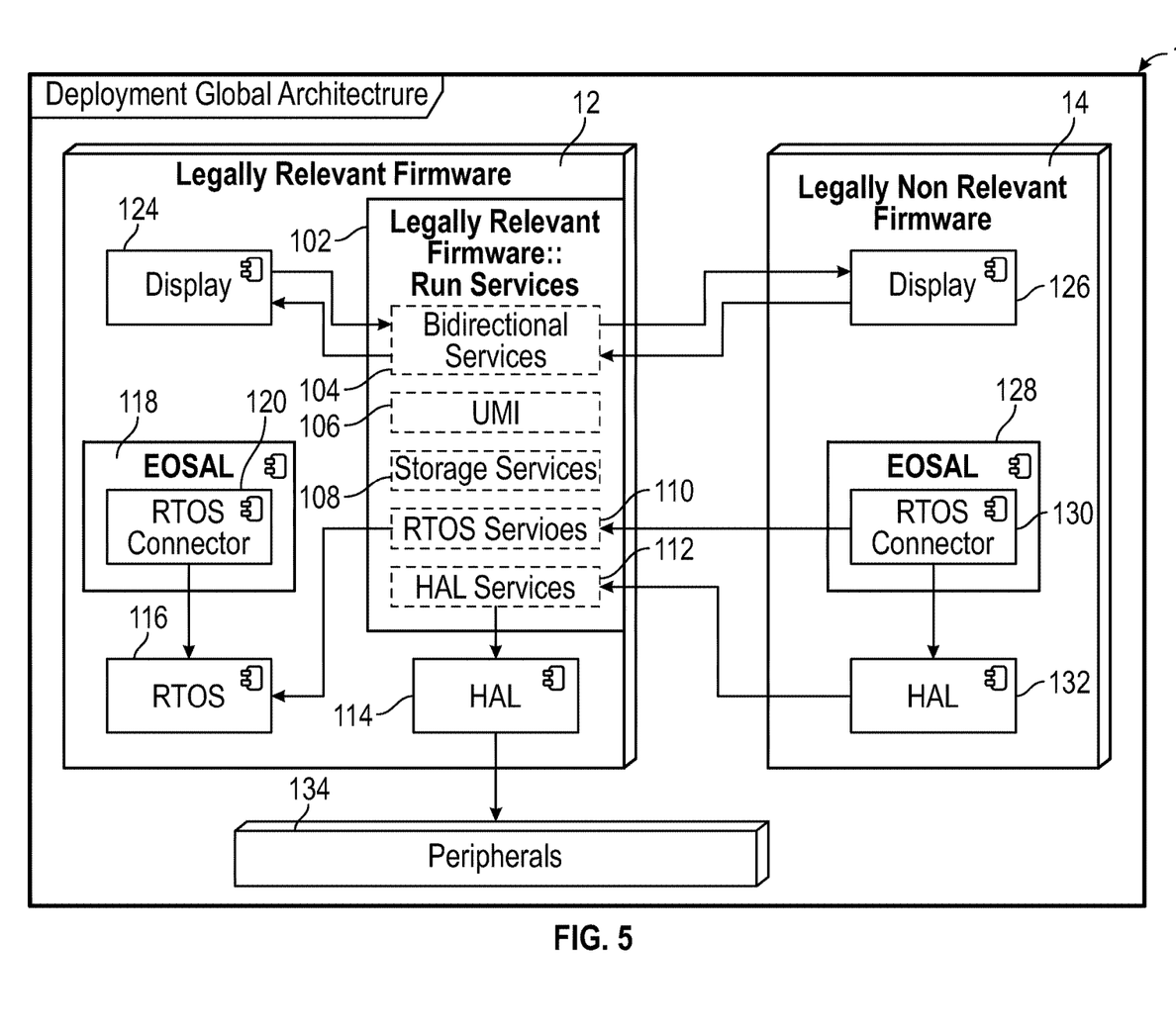
FIG. 5 illustrates a global architecture diagram of an energy meter, in accordance with an embodiment.

FIG. 5 illustrates a global architecture diagram of the energy meter 10, in accordance with an embodiment. In the embodiment of the energy meter 10 shown in FIG. 5, the energy meter 10 can be divided into sections or areas—legally relevant firmware 12 shown an the left and legally non-relevant firmware 14 shown at the right in FIG. 5. The legally relevant firmware 12 can include or process functionalities related to, for example, a display 124, EO SAL 118 (including RTOS connector 120), and an RTOS 116.

The legally relevant firmware 12 can also include or process functionalities related to an interface 102 to legally relevant firmware (run services) including bidirectional services 104, UMI 106, storage services 108, RTOS services 110, and HAL services 112. The legally relevant firmware 12 can further include a HAL 114 that can communicate with peripherals 134 (which are analogous to the unprivileged and/or privileged peripherals shown in FIG. 4). The legally non-relevant firmware 14 can include or control features such as, for example, a display 126, EO SAL 128 (including an RTSO connector 130), and HAL 132.

Figure 6:
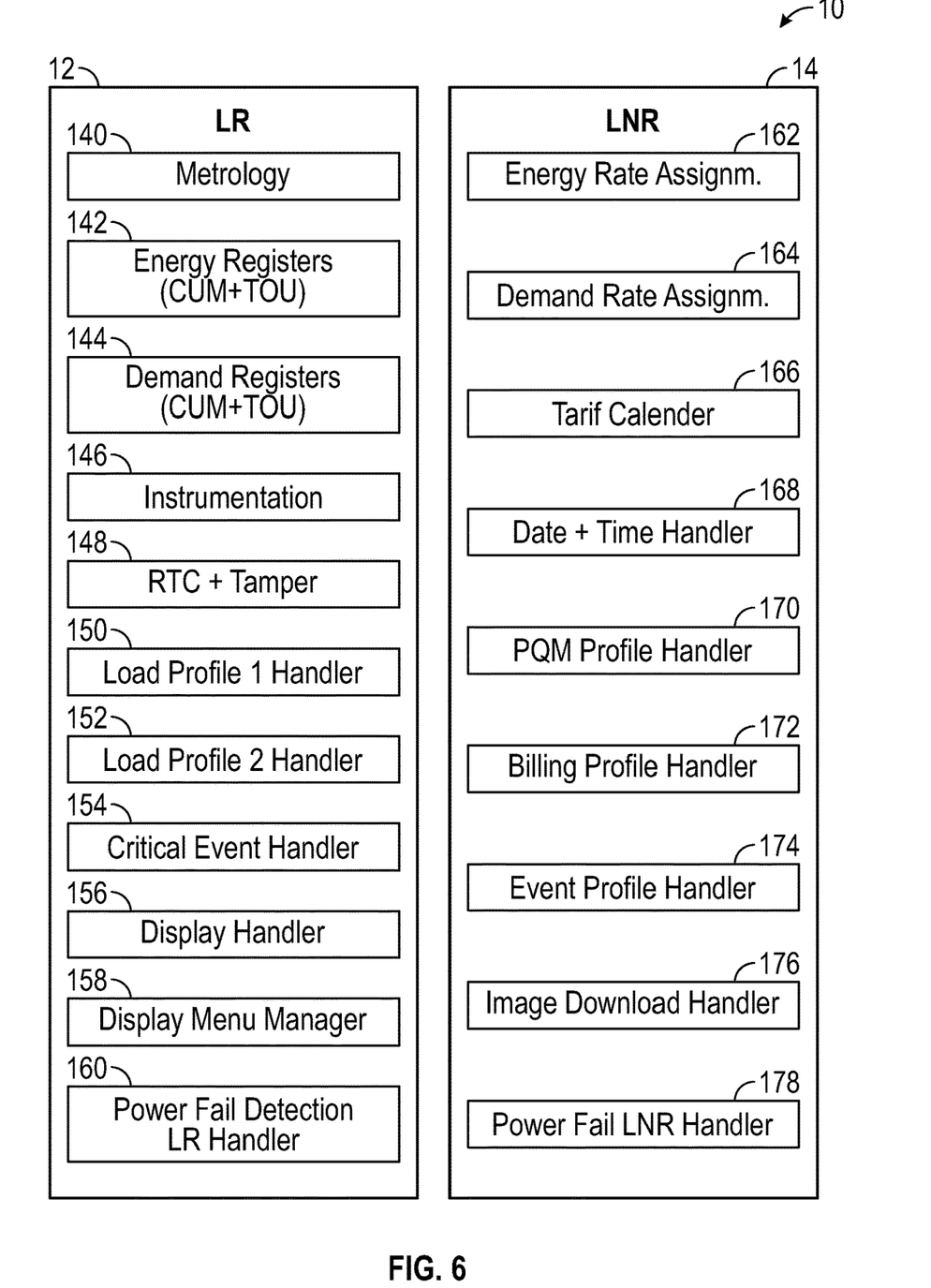
FIG. 6 illustrates a block diagram of an energy meter including legal relevant and legally non-relevant features, in accordance with an embodiment.

FIG. 6 illustrates a block diagram of an energy meter 10 including bifurcated legal relevant functions 12 and legally non-relevant functions 14, in accordance with an embodiment. As shown in FIG. 6, the legal relevant functions 12 can include, for example, metrology 140, energy registers 142, demand registers 144, instrumentation 146, RTC+tamper 148, a load profile 1 handler 150, a load profile 2 handler 152, a critical event handler 154, a display handler 156, a display menu manager 158, and a power fail detection LR handler 160. The legally non-relevant functions 14 can include, for example, an energy rate assignment 162, a demand rate assignment 164, a tariff calendar 166, date+time handler 168, a PQM profile handler 170, a billing profile handler 172, an event profile handler 174, an image download handler 176, and a power fail LNR handler 178.

Note that the term 'handler' as utilized herein can relate to an event handler, which can be attached to an event so that when the event occurs, the handler may be invoked. A handler can be implemented as code (e.g., a subroutine) that can execute when the associated event occurs.

Figure 7:
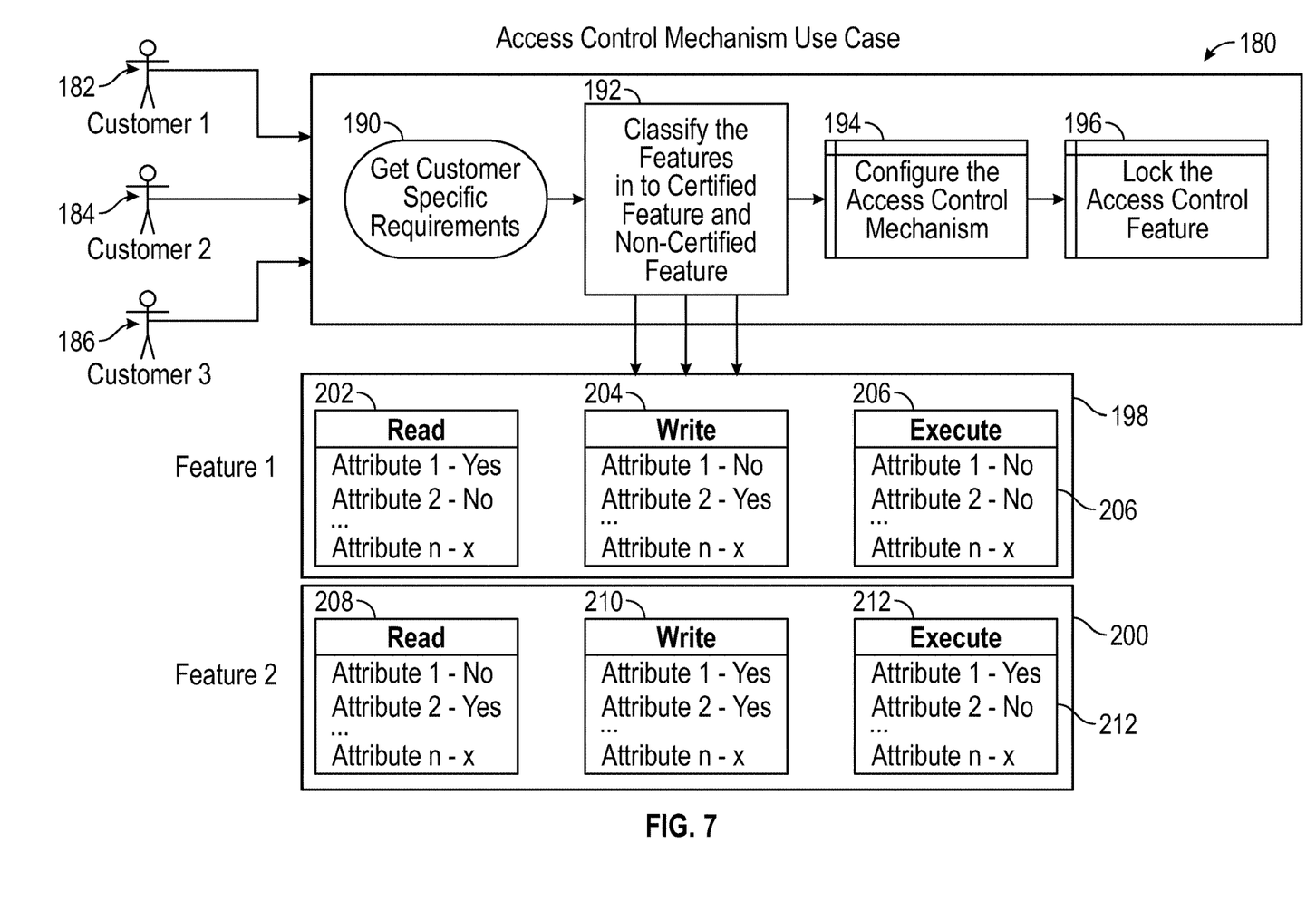
FIG. 7 illustrates a flow chart of operations depicting logical operational steps of a method of access control, in accordance with an embodiment.

FIG. 7 illustrates a flow chart of operations depicting logical operational steps of a method 180 of access control to the energy meter 10, in accordance with an embodiment.

The method 180 shown in FIG. 7 relates to an access control mechanism use case and can involve a number of customers such as, for example, a first customer 182, a second customer 184, a third customer 186, and so on.

As depicted at block 190, a step or operation can be implemented to obtain customer specific requirements related to the energy meter 10 from one or more of the customers 182, 184, 186, and so on. Thereafter, as shown at block 192, a step or operation can be implemented to classify the features (e.g., functions) associated with the energy meter 10 into certified features and non-certified features. Next, as depicted at block 194, a step or operation can be implemented to configure the access control mechanism such as the access controller 22 previously discussed herein. Thereafter, as shown at block 196, a step or operation can be implemented to lock the access control feature provided by the access controller 22.

Regarding the configuration operation shown at block 194, particular read, write and execute operations can be implemented with respect to a first feature 198 and a second feature 200. For example, a read operation 202, a write operation 204 and an execute operation 206 can be implemented for the first feature 198. A read operation 208, a write operation 210 and an execute operation 212 can be implemented for the second feature 212. Read, write and execute operations can be implemented for other features (e.g., third feature, fourth feature, fifth feature, etc).

Figure 8:
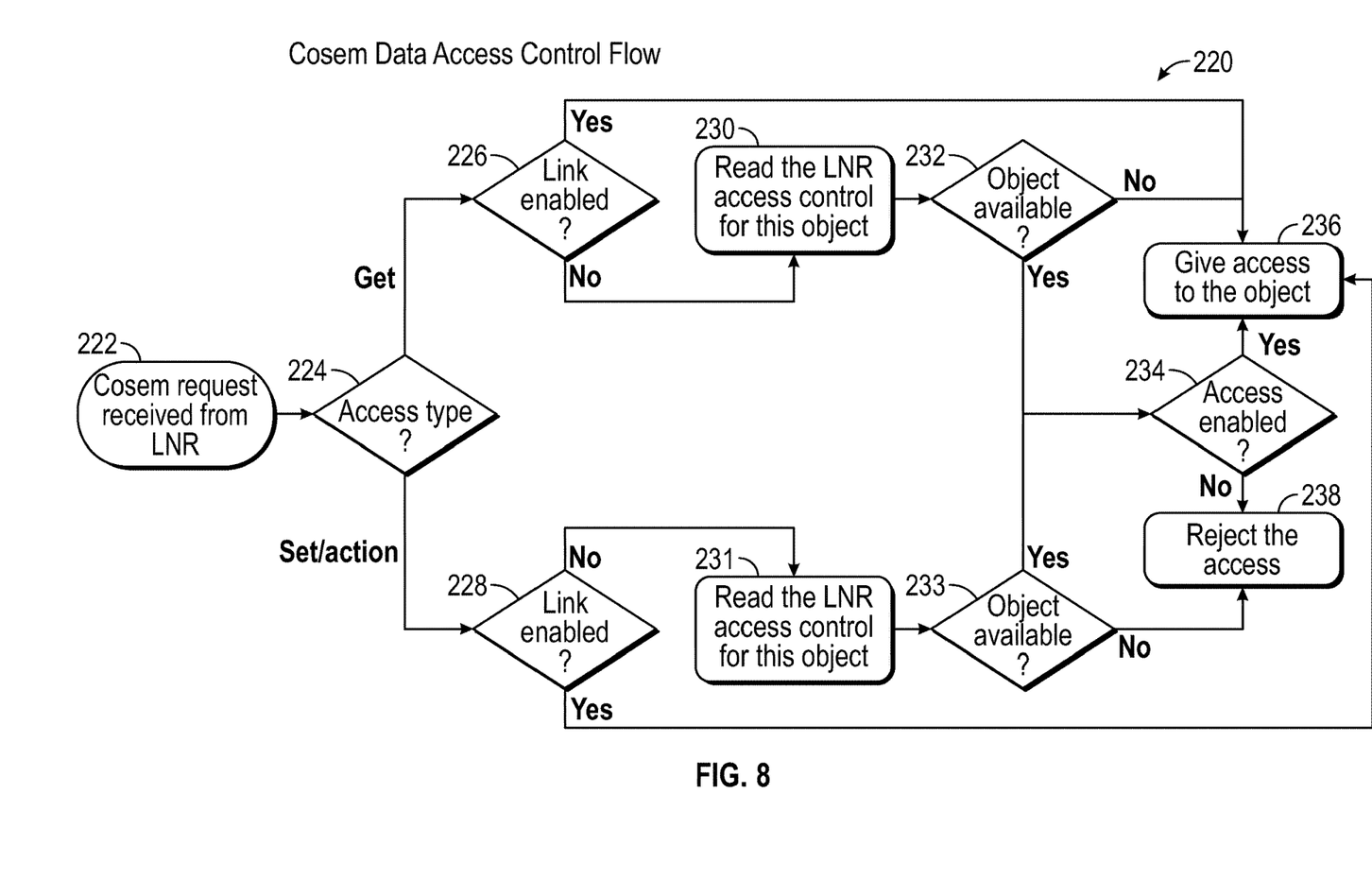
FIG. 8 illustrates a flow chart of operations depicting logical operational steps of a method of data access control flow for an energy meter, in accordance with an embodiment.

FIG. 8 illustrates a flow chart of operations depicting logical operational steps of a method of data access control flow for an energy meter, in accordance with an embodiment. As shown at block 222, a request can be received from LNR. Next, as depicted at decision block 224, an access type can be determined. Depending on the outcome of step or operation shown at decision block 224, two operational paths are possible. A "Get" path or a "Set/Action" path may be followed. Assuming the "Get" path is followed, then a step or operation can be implemented as shown at decision block 226 to enable a link. A "yes" outcome with respect to the operation shown at decision block 226 can result in giving access to the object, as shown at block 236. A "No" outcome with respect to decision block 226 leads to the implementation of a step or operation to read the LNR access control for this object.

Thereafter, as indicated by decision block 232, a step or operation can be implemented to determine if the object is available. If "no" then the operation shown at block 236 can be implemented. If "yes" then an "access enabled" step or operation can be implemented as shown at block 234. Following processing of the step or operation shown at block 234, the "give access to the object" operation depicted at block 236 can be implemented or a "reject the access" step or operation can be implemented as shown at block 238.

A similar flow of operations can be followed with respect to the operations shown at decision block 228 ("link enabled"), block 231 ("read the LNR access control for this object"), decision block 233 ("object available") and so on.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a bidirectional data communications network such as a local area network (LAN) or a wide area network (WAN), a wireless local area network (WLAN), wireless data network e.g., Wi-Fi, Wimax, 802.xx, and/or a cellular network or the bidirectional connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block or feature of the illustrations, and combinations of blocks or features, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks or elsewhere herein. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
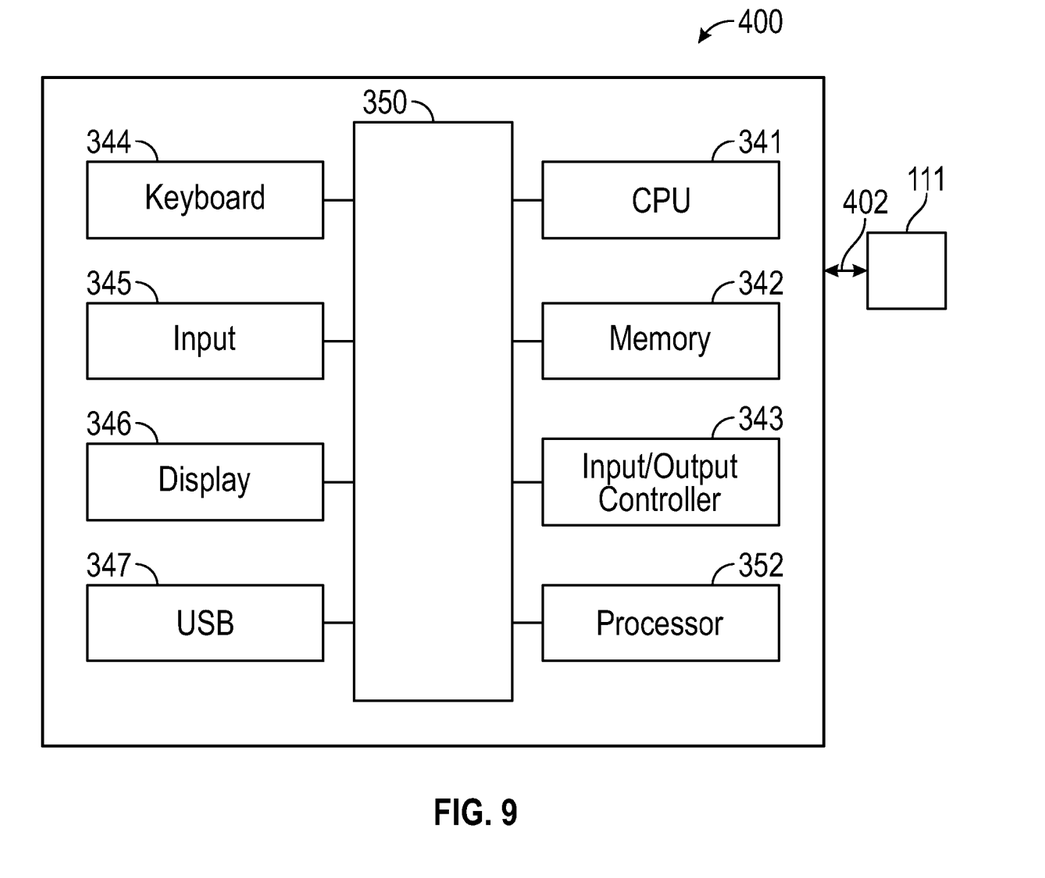
FIG. 9 illustrates a schematic view of a data-processing system, in accordance with an embodiment.
Figure 10:
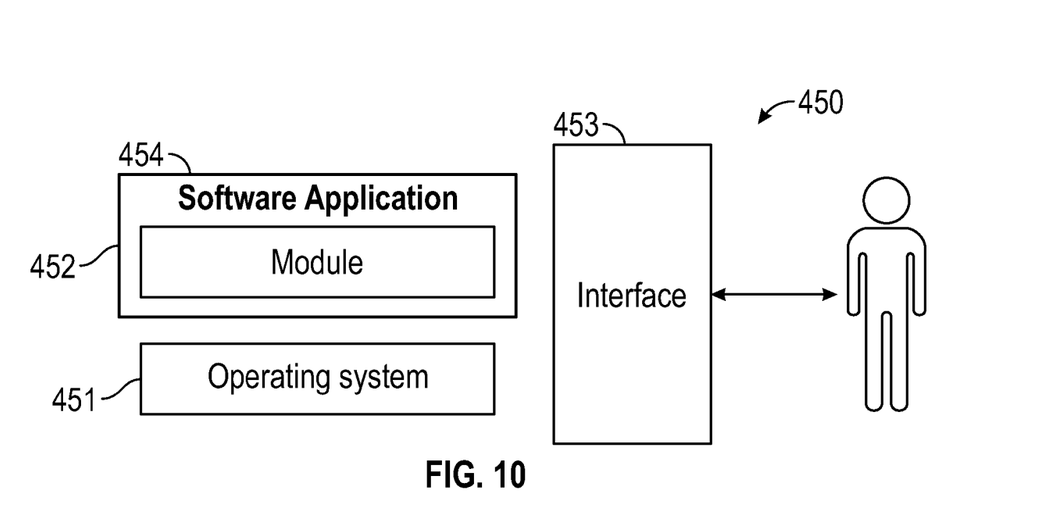
FIG. 10 illustrates a schematic view of a software system including a module, an operating system, and a user interface, in accordance with an embodiment.

FIG. 9 and FIG. 10 are shown only as exemplary diagrams of data-processing environments in which example embodiments may be implemented. It should be appreciated that FIG. 9 and FIG. 10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, an embodiment may be implemented in the context of a data-processing system 400 that can include, for example, one or more processors such as a CPU (Central Processing Unit) 341 and/or other another processor 352 (e.g., microprocessor, microcontroller etc), a memory 342, an input/output controller 343, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a smartphone, a tablet computing device, a networked computer server, and so on, wherein each such device can be operably connected to and/or in communication with a client-server based network or other types of networks (e.g., cellular networks, Wi-Fi, etc). The data-processing system 400 can communicate with other devices such as, for example, an electronic device 111. Communication between the data-processing system 400 and the electronic device 111 can be bidirectional, as indicated by the double arrow 402. Such bidirectional communications may be facilitated by, for example, a computer network, including wireless bidirectional data communications networks.

FIG. 10 illustrates a computer software system 450 for directing the operation of the data-processing system 400 depicted in FIG. 9. Software application 454, stored for example in the memory 342 can include one or more modules such as module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions, steps or operations such as those discussed herein. Module 452 may also be composed of a group of modules and/or sub-modules.

The following discussion is intended to provide a brief, general description of suitable computing environments in which the system and method may be implemented. The disclosed embodiments can be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that can perform particular tasks or which can implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (e.g., accessible only to that module) and which can include source code that actually implements the routines in the module. The term module can also relate to an application, such as a computer program designed to assist in the performance of a specific task, such as implementing the steps, operations or instructions described herein.

The method 180 shown in FIG. 7 can be implemented at least in part by a module (or group of modules). For example, the instructions, steps or operations depicted in FIG. 7 with respect to blocks 190, 192, 194, 196, 198, and 200 can be implemented by a module such as the module 452 shown in FIG. 10.

Similarly, the method 220 of data access control flow depicted in FIG. 8 can be implemented as a module or a group of modules. For example, the instructions, steps or operations depicted in FIG. 8 with respect to blocks 222, 224, 226, 228, 230, 231, 232, 233, 234, 236, and 238 can be implemented by a module such as the module 452 shown in FIG. 10. The access controller 22 may also be implemented by or as a module.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of access control, comprising:
   dynamically controlling an access to firmware running a certified feature in an energy meter and a non-certified feature in the energy meter, wherein the access is based on a bifurcation between the certified feature and the non-certified feature running in the energy meter, wherein the non-certified feature relates to a legally non-relevant feature,
   receiving a request for the access to the firmware;
   permitting the access to the firmware, in response to determining that the request relates to the certified feature; or
   denying the access to the firmware, in response to determining that the request relates to the non-certified feature, wherein the request is considered not valid, when the request relates to the non-certified feature and wherein the legally non-relevant feature further includes a billing profile handler;
   generating an error response when the request is related to the non-certified feature; and
   sending the error response to a user associated with the request,
   wherein permitting the access to the firmware allows implementation of a read operation, a write operation and an execute operation for the certified feature and denying the access to the firmware allows implementation of the read operation for the non-certified feature,
   wherein the certified feature relates to a legally relevant feature and the non-certified feature relates to the legally non-relevant feature in the energy meter,
   wherein the legally relevant feature includes at least one of: a metrology, demand registers, instrumentation, a load profile handler, a critical event handler, a display handler, and a display menu manager in the energy meter, and
   wherein the legally non-relevant feature includes at least one of: an energy rate assignment, a demand rate assignment, a tariff calendar, a date and time handler, a profile handler, an event profile handler, and an image download handler in the energy meter.

2. The method of claim 1, wherein the access is based on the bifurcation between the certified feature and the non-certified feature running in the energy meter on at least one of: a single microcontroller or a group of different microcontrollers.

3. The method of claim 1, wherein the access to the firmware is dynamically controlled by an access controller associated with the energy meter and wherein the legally relevant feature further includes energy registers.

4. A method of access control, comprising:
   dynamically controlling an access to firmware running a certified feature in an energy meter and a non-certified feature in the energy meter, wherein the access is based on a bifurcation between the certified feature and the non-certified feature running in the energy meter on at least one of: a single microcontroller or a group of different microcontrollers,
   wherein the certified feature relates to a legally relevant feature and the non-certified feature relates to a legally non-relevant feature in the energy meter,
   wherein the legally relevant feature includes at least one of: metrology, demand registers, instrumentation, a load profile handler, a critical event handler, a display handler, and a display menu manager in the energy meter, and wherein the legally non-relevant feature includes at least one of: an energy rate assignment, a demand rate assignment, a tariff calendar, a date and time handler, a profile handler, an event profile handler, and an image download handler in the energy meter;

receiving a request for the access to the firmware;

permitting the access to the firmware, in response to determining that the request relates to the certified feature; or denying the access to the firmware, in response to determining that the request relates to the non-certified feature, wherein the request is considered not valid, when the request relates to the non-certified feature and wherein the legally non-relevant feature further includes a billing profile handler;

wherein permitting the access to the firmware allows implementation of a read operation, a write operation and an execute operation for the certified feature and denying the access to the firmware allows implementation of the read operation for the non-certified feature;

generating an error response when the request is related to the non-certified feature; and sending the error response to a user associated with the request.

5. The method of claim 4, wherein the request is considered not valid, when the request relates to the non-certified feature and wherein the legally relevant feature further includes energy registers.

6. A system for access control to an energy meter, comprising:

the energy meter; and an access controller associated with the energy meter, wherein the access controller is operable to dynamically control an access to firmware running a certified feature in the energy meter and a non-certified feature in the energy meter, wherein the access is based on a bifurcation between the certified feature and the non-certified feature running in the energy meter, wherein the non-certified feature relates to a legally non-relevant feature;

receives a request for the access to the firmware;

permits the access to the firmware, in response to determining that the request relates to the certified feature; or denies the access to the firmware, in response to determining that the request relates to the non-certified feature, wherein the request is considered not valid, when the request relates to the non-certified feature and wherein the legally non-relevant feature further includes a billing profile handler;

generates an error response when the request is related to the non-certified feature; and send the error response to a user associated with the request;

wherein permission of the access to the firmware allows implementation of a read operation, a write operation and an execute operation for the certified feature and denial of the access to the firmware allows implementation of the read operation for the non-certified feature, wherein the certified feature relates to a legally relevant feature and the non-certified feature relates to the legally non-relevant feature in the energy meter, wherein the legally relevant feature includes at least one of: metrology, demand registers, instrumentation, a load profile handler, a critical event handler, a display handler, and a display menu manager in the energy meter, and wherein the legally non-relevant feature includes at least one of: an energy rate assignment, a demand rate assignment, a tariff calendar, a date and time handler, a profile handler, an event profile handler, and an image download handler in the energy meter.

7. The system of claim 6, wherein the access is based on the bifurcation between the certified feature and the non-certified feature running in the energy meter on at least one of: a single microcontroller or a group of different microcontrollers.

8. The system of claim 6, wherein the access to the firmware is dynamically controlled by the access controller associated with the energy meter and wherein the legally relevant feature further includes energy registers.

9. The system of claim 6 further comprising an event handler comprising the billing profile handler.

10. The system of claim 6 wherein the event handler further comprises at least one of: a load profile handler and a critical event handler.

11. The system of claim 6 wherein the event handler further comprises a load profile handler and a critical event handler.

12. The system of claim 6 wherein the event handler further comprises at least one of: a display handler and a display menu handler.

13. The system of claim 6 wherein the event handler further comprises a display handler and a display menu handler.

14. The system of claim 6 wherein the event handler further comprises at least one of: a power fail detection handler and an image download handler.

15. The system of claim 6 wherein the event handler further comprises a power fail detection handler and an image download handler.

16. The system of claim 6 wherein the legally relevant feature comprises legally relevant firmware.

17. The system of claim 16 wherein the legally relevant firmware includes or processes functionalities related to at least one of: a display, a real-time operating system (RTOS), and an RTOS connector.

18. The system of claim 16 wherein the legally relevant firmware includes or processes functionalities related to at least one of: a real-time operating system (RTOS) and an RTOS connector.

19. The system of claim 16 wherein the legally relevant firmware includes or processes functionalities related to at least one of: a display and a real-time operating system (RTOS).

* * * * *